United States Patent [19]
Rexford

[11] 3,839,822
[45] Oct. 8, 1974

[54] MODEL TRAIN SOUND SIMULATOR
[75] Inventor: Willis Ernest Rexford, Girard, Pa.
[73] Assignee: Louis Marx & Co., Inc., New York, N.Y.
[22] Filed: May 23, 1973
[21] Appl. No.: 363,282

[52] U.S. Cl. .................................. 46/232, 46/217
[51] Int. Cl. ............................................ A63h 19/14
[58] Field of Search ... 46/216, 232, 243 M, 243 LV

[56] References Cited
UNITED STATES PATENTS
2,854,195  9/1958  Bittles .................................. 46/216
3,664,060  5/1972  Longnecker ......................... 46/232

Primary Examiner—Antonio F. Guida
Assistant Examiner—Robert F. Cutting
Attorney, Agent, or Firm—Blum, Moscovitz, Friedman & Kaplan

[57] ABSTRACT

A model train sound generator entirely contained within a model train unit to simulate the puffing sound of a locomotive. A model train unit is provided with a wheel adapted to engage a track for rotation during train travel and further includes a sound generating means contained within the model train unit. The sound generating means, in response to a first and second signal supplied by the rotating wheel, simulates the puffing sound of a locomotive.

8 Claims, 6 Drawing Figures

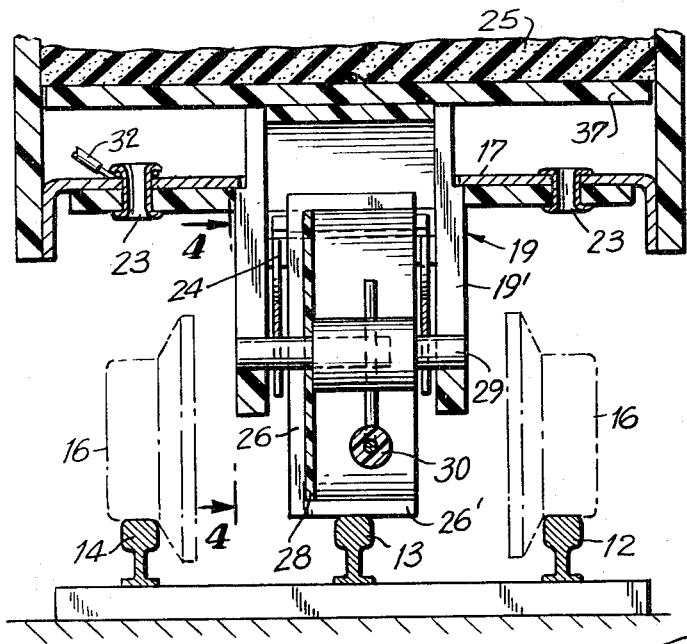
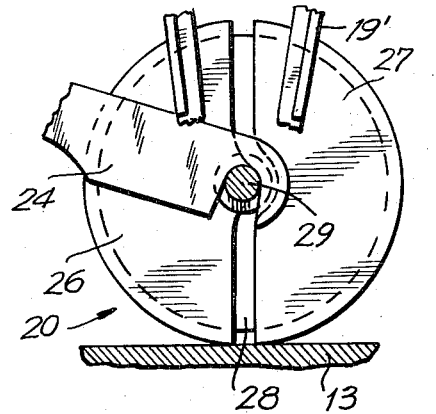
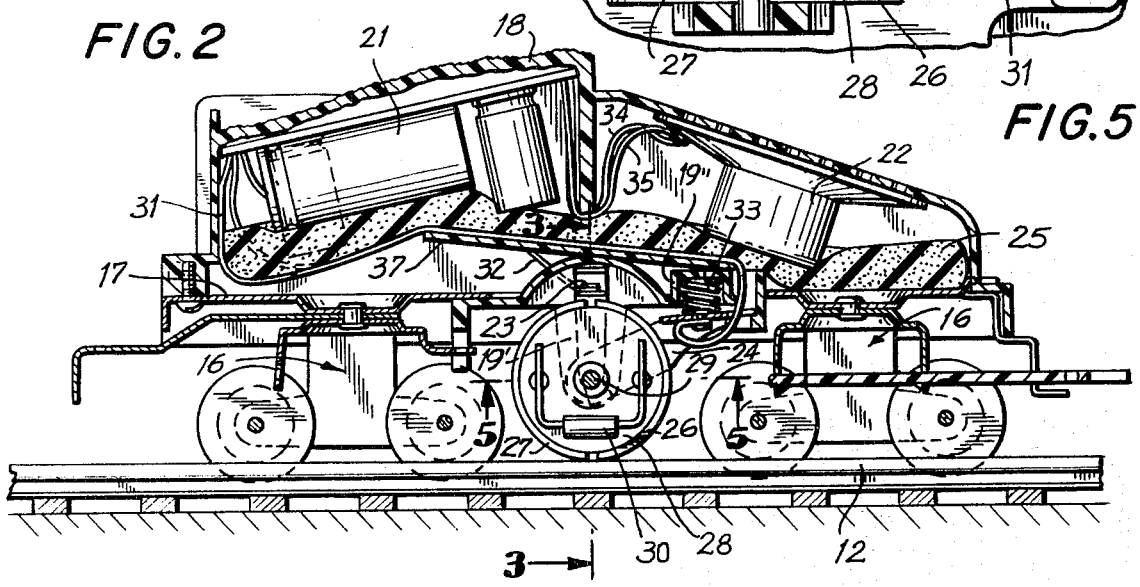

MODEL TRAIN SOUND SIMULATOR

BACKGROUND OF THE INVENTION

This invention relates generally to an audio simulator circuit in a model train and especially to an audio simulator disposed within a model train tender unit for simulating the puffing sound of a real locomotive.

It has long been recognized that the puffing sound of a locomotive can be simulated by generating a hissing sound and intermittently interrupting the hissing sound. While many different arrangements have been developed to generate the puffing sound of a locomotive, they have required the placement of audio circuitry and/or loudspeakers remote from the individual model train unit. In view of the desire to simulate realism in the model trains, the remote placement of the circuitry and/or loudspeakers is less than completely satisfactory.

SUMMARY OF THE INVENTION

Generally speaking, in accordance with the invention, a sound simulator including a loudspeaker and an electronic noise generating circuit are mounted in a conventional model train carriage. A wheel is mounted on the train carriage and is coupled to said electronic circuitry and rides along an energized track to supply first and second signals to the electronic circuit. A first and second audio representation corresponding to said first and second signals are generated by said sound simulator to simulate the puffing sound of a locomotive.

Accordingly, it is an object of this invention to provide an improved model train sound simulator for simulating the puffing sound of a locomotive.

Another object of this invention is to provide an improved sound simulator which is entirely contained within a model train unit for simulating the sound of a puffing locomotive.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a sectional view of the model train tender unit taken along line 2—2 of FIG. 1 and showing the structural components and operative elements;

FIG. 3 is a partial sectional view taken along line 3—3 of FIG. 2;

FIG. 4 is a partial sectional view taken along line 4—4 of FIG. 3;

FIG. 5 is a partial sectional view taken along line 5—5 of FIG. 2; and

DESCRIPTION OF THE PREFERRED EMBODIMENT

Figure 1:
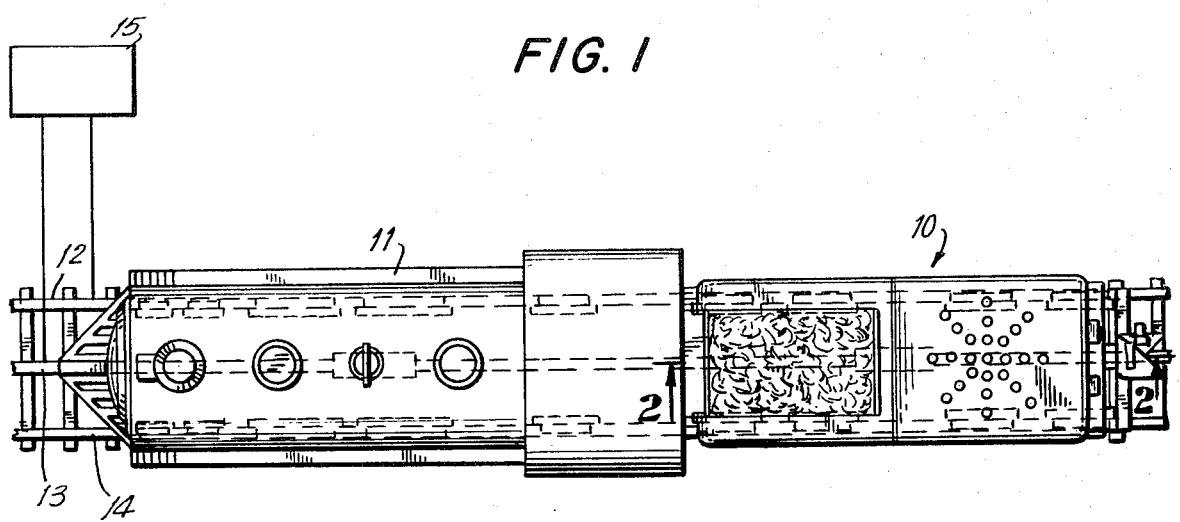
FIG. 1 is a top plan view of a model train tender unit coupled to a model train locomotive unit and positioned on a track.

Referring now to FIG. 1, a model train tender unit, generally indicated as 10, is illustrated therein. The model train tender unit 10 is coupled to a model train locomotive unit 11, and both units 10 and 11 are disposed on rails 12 and 14 which rails comprise the track upon which the model train operates. The track also includes a center rail 13 electrically insulated from rails 12 and 14. A transformer 15 is shown connected to the outside rail 12 and center rail 13. As is well understood by the skilled artisan, locomotive unit 11 is responsive to power supplied to the rails 12 and 13 from transformer 15, and is thereby driven at speeds proportional to the current supplied.

Referring specifically to FIGS. 2 through 5, tender unit 10 is illustrated therein and comprises a standard model train unit chassis 17 formed of an electrically conductive material. The chassis 17 is supported upon and electrically coupled to rails 12 and 14 by conventional track engaging wheel assemblies 16, mounted thereto.

The chassis 17 supports a carriage molding 18 which carriage molding is shaped in the form of a railroad tender car. Contained in the molding 18, and supported by the chassis 17 is an electronic noise generating circuit 21 and a loudspeaker 22. A sponge padding 25 is disposed between the chassis 17 and the electronic noise generating circuit 21 and loudspeaker 22 to provide a cushiony support to the noise generating circuit and loudspeaker and further secure the same within the molding. An insulating board 37 disposed between the sponge padding 25 and the chassis 17 guarantees insulation between the noise generating circuit 21 and the wheel 20 which is hereinafter discussed.

Mounted to the chassis on the bottom side by means of mounting rivets 23 is wheel support assembly 19 formed of an electrically insulating material such as plastic. The wheel support assembly 19 includes channel guides 19' extended downward toward the center rail to provide a vertical channel for a conductive axle 29 to be vertically displaced therein.

Conductive axle 29 is secured in electrically conductive engagement to a first semicircular conductor 26. The first semicircular conductor supports an insulating disc 28, which disc in turn supports a second semicircular conductor 27 electrically insulated from said conductive axle 29 and said first semicircular conductor 26. The semicircular conductors 26 and 27 each have formed thereon a flat cylindrical surface 26' and 27' respectively, which flat surfaces define the circular shape of a wheel generally indicated at 20, and provide a flat lateral surface for contacting the rail. The first semicircular conductor 26 is electrically coupled to the second semicircular conductor 27 through a resistor 30.

Chassis 17 further includes a conductive braket 24 pivotally mounted to wheel support assembly 19 at a first end, and rotatably retaining conductive axle 29 of wheel 20 within channel guides 19' at the other end. A coil spring 33 is mounted in a well 19" formed in wheel support assembly 19 and compressed between said well and conductive bracket 24, to force wheel 20 carried by conductive bracket 24 into pressure engagement with center rail 13.

A first wire 31 electrically couples conductive bracket 24, and therefore rail 13, to noise generating circuit 21, and a second wire 32 electrically couples noise generating circuit 21 to a mounting rivet 23, and therefore rails 12 and 14. Loudspeaker 22 is electrically coupled to the output of noise generating circuit 21 by third and fourth wires, 34 and 35. Accordingly, when first semicircular conductor 26 is in contact with energized center rail 13, a closed serial circuit including first semicircular conductor 26, conductive axle 29, conductive bracket 24, first wire 31, noise generating circuit 21, second wire 32, rivet 23, chassis 17, rail 12 and transformer 15 is formed. Similarly, when the second semicircular conductor 27 is in contact with center rail 13 a corresponding serial circuit is formed except that second semicircular conductor 27 and resistor 30 are connected between rail 13 and first semicircular conductor 26.

Figure 6:
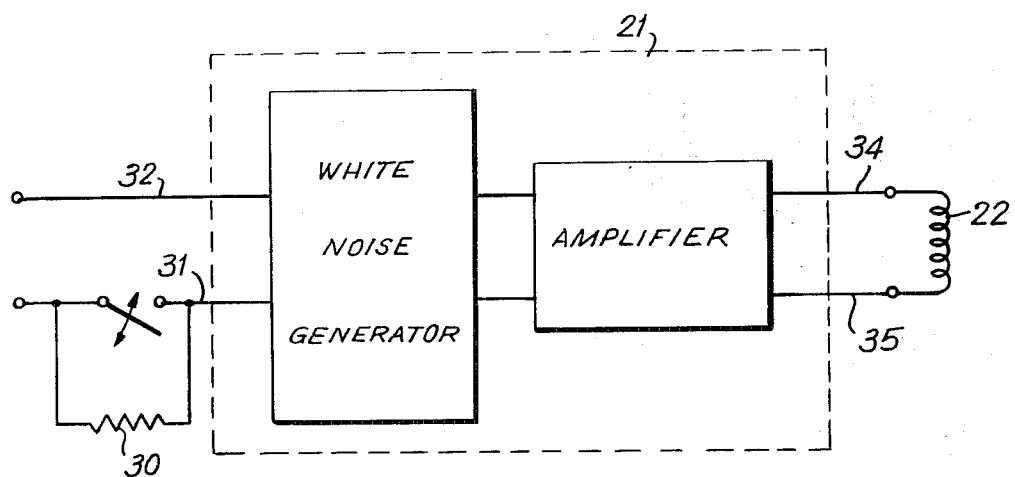
FIG. 6 is a block diagram of the electronic sound simulator circuit of the instant invention.

The electronic noise generating circuit 21, represented in FIG. 6, includes a white noise generator and an amplifier. The noise generating circuit 21 may be the type disclosed in POPULAR ELECTRONICS, February 1972, at 45 & 46, and as is appreciated by the skilled artisan generates an a.c. signal which is supplied to loudspeaker 22 to provide a hissing sound therefrom.

In operation, a transformer 15 provides power to outer rail 12 and center rail 13. Accordingly, locomotive 11 coupled to the tender unit 10 is energized and the locomotive pulls the tender unit along the track at a speed proportional to the current supplied to the rails. Wheel 20 which is in engagement with the center rail 13 rotates at substantially the same speed as the wheels on the locomotive. As wheel 20 rotates and semicircular conductor 26 contacts the center rail 13, the current conducted in the center rail is supplied to the electronic noise generating circuit 21 which in turn activates loudspeaker 22 to generate a hissing sound of a volume proportional to the current supplied to the center rail 13. As the wheel 20 continues to rotate, the second semicircular conductor 27 rotatably contacts rail 13. The second semicircular conductor 27 which is electrically insulated from the remaining conductive elements, except through the resistor 30, conducts current through resistor 30 to the circuit formed by the first conductive portion 26. The resistance causes a corresponding drop in the voltage supplied to the noise generating circuit 21. The drop in voltage generates a hissing sound of a lower level than the sound corresponding to the first conductor 26. As the wheel continues to roll on the track the alternate high and low level hissing sounds generated by the electronic circuit effect an accurate simulation of the puffing sound of a locomotive at a rate proportional to the speed of the train.

Although the sound simulating device is shown and described in a model train tender unit, it is understood that any model train unit could be utilized to carry such device. Moreover, it is further understood that the wheel arrangement discussed hereinabove, although particularly described with reference to a model train unit operated on tracks comprised of three rails, can be utilized on model train units that operate on tracks comprised of only two rails.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

What is claimed is:

1. In a model train, a sound simulator assembly comprising in combination: a wheel means mounted to said model train and adapted to be rotatably disposed against an energized track; and sound generator means disposed in said model train, said sound generator means including a noise generating circuit and a loudspeaker and coupled to said wheel means, said sound generator means adapted to generate a first audio representation when a first portion of said wheel means is in contact with the track and a second audio representation when a second portion of said wheel means is in contact with the track.

2. In a model train as claimed in claim 1 wherein said first audio representation is responsive to a first voltage signal supplied by said first portion of said wheel means and said second audio representation is responsive to a second voltage supplied by said second portion of said wheel means.

3. In a model train as claimed in claim 2 wherein said first portion and said second portion of said wheel means each includes substantially semicircular conductors.

4. In a model train as claimed in claim 3 wherein said first and second semicircular conductors are electrically insulated from each other, said noise generating circuit is electrically coupled to said first semicircular conductor and said first semicircular conductor is electrically coupled to said second semicircular conductor through an impedance.

5. In a model train as claimed in claim 2 wherein said noise generating circuit includes a white noise generator electrically coupled to said wheel means, an amplifier electrically coupled to said white noise generator, said loudspeaker being electrically coupled to said amplifier.

6. In a model train as claimed in claim 2 wherein both audio representations are hissing sounds of different volumes whereby the sound simulated is that of the puffing of a locomotive.

7. In a model train, as claimed in claim 1, including a single model train unit carrying both said wheel means and said sound generator means.

8. In a model train as claimed in claim 7 wherein said model train unit is a tender car.

* * * * *